(12) United States Patent
Potadar

(10) Patent No.: US 11,017,398 B2
(45) Date of Patent: May 25, 2021

(54) SYSTEMS AND METHODS FOR PROCESSING AN ACCESS REQUEST

(71) Applicant: MASTERCARD INTERNATIONAL INCORPORATED, Purchase, NY (US)

(72) Inventor: Santosh Sitaram Potadar, Maharashtra (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 120 days.

(21) Appl. No.: 15/944,996

(22) Filed: Apr. 4, 2018

(65) Prior Publication Data

US 2018/0293580 A1    Oct. 11, 2018

(30) Foreign Application Priority Data

Apr. 7, 2017  (SG) .......................... 10201702881V

(51) Int. Cl.
*G06Q 20/40* (2012.01)
*G06Q 20/38* (2012.01)
(Continued)

(52) U.S. Cl.
CPC ....... *G06Q 20/4014* (2013.01); *G06Q 20/385* (2013.01); *H04L 63/083* (2013.01);
(Continued)

(58) Field of Classification Search
CPC .............. G06Q 20/4014; G06Q 20/385; G06Q 20/4016; G06Q 20/405; G06Q 20/02; G06Q 20/3821; G06Q 20/401; G06Q 20/065; G06Q 20/10; G06Q 20/12; G06Q 20/3224; G06Q 20/3829; G06Q 20/40; G06Q 2220/00; H04L 63/083; H04L 63/0876;
(Continued)

(56) References Cited

U.S. PATENT DOCUMENTS 4,715,032 A * 12/1987 Nilsson .................. H04Q 11/04
                                                         370/383
6,581,161 B1    6/2003 Byford
(Continued)

FOREIGN PATENT DOCUMENTS

WO    WO2014151249 A1    9/2014

*Primary Examiner* — Alexander G Kalinowski
*Assistant Examiner* — Sanjeev Malhotra
(74) *Attorney, Agent, or Firm* — Armstrong Teasdale LLP

(57) ABSTRACT

A system for controlling access to a physical asset and associated servers and methods are provided. The system includes an access control terminal coupled to the physical asset and operable to read a token from a user token device associated with a user, and generate control signals to allow access to the physical asset, an access control processing server operable to receive an access request from the access control terminal, the access request including the token, generate an authentication verification request including the token, send the authentication verification request to a network, receive an authentication response from the network, generate an access control response to cause the access control terminal to allow access to the asset in response to the authentication response, and send the access control response to the access control response.

21 Claims, 5 Drawing Sheets

(51) Int. Cl.
    *H04L 29/06*     (2006.01)
    *H04W 12/06*     (2021.01)
    *G07C 9/27*     (2020.01)
    *G07C 9/29*     (2020.01)

(52) U.S. Cl.
    CPC .......... *H04L 63/0853* (2013.01); *H04L 63/10* (2013.01); *H04W 12/068* (2021.01); *G07C 9/27* (2020.01); *G07C 9/29* (2020.01); *H04L 2463/082* (2013.01); *H04L 2463/102* (2013.01)

(58) Field of Classification Search
    CPC ............... H04L 63/107; H04L 2209/56; H04L 2463/121; H04L 63/0428; H04L 63/0435; H04L 63/0807; H04L 63/0853; H04L 63/0861; H04L 63/10; H04L 63/102; H04L 9/3247; H04L 63/061; H04L 63/062; H04L 63/08; H04L 63/101; H04L 63/105; H04L 63/108; H04L 63/123; H04L 9/14; H04L 9/30; H04L 9/32; H04L 9/3226; H04L 9/3271; G06F 21/31; G06F 21/36; G06F 21/44; G06F 21/45; G06F 21/602; G06F 21/6218; H04W 12/00503; H04W 12/06; H04W 12/0023
    USPC ...... 705/2, 7.11, 7.36, 26.41, 28, 37, 44, 59, 705/71, 307; 726/4, 5, 6, 9, 29; 713/172, 182, 189; 700/28; 340/5.53; 370/383
    See application file for complete search history.

(56) References Cited

U.S. PATENT DOCUMENTS

| | | | |
|---|---|---|---|
| 9,148,416 B2 | 9/2015 | Tse | |
| 9,378,600 B2 | 6/2016 | Clark | |
| 9,438,635 B2 | 9/2016 | Tse | |
| 9,626,816 B2 | 4/2017 | Clark | |
| 2004/0015408 A1* | 1/2004 | Rauen, IV | G06Q 30/0613 705/26.41 |
| 2005/0049882 A1* | 3/2005 | Sawka | G06Q 10/103 705/7.36 |
| 2006/0101274 A1* | 5/2006 | Merkert, Sr. | H04L 63/08 713/182 |
| 2007/0266428 A1* | 11/2007 | Downes | G06F 21/36 726/5 |
| 2008/0222417 A1* | 9/2008 | Downes | G06F 21/36 713/172 |
| 2009/0076879 A1* | 3/2009 | Sparks | G06Q 10/063 705/7.11 |
| 2009/0128287 A1* | 5/2009 | Dragon | G07C 9/00944 340/5.53 |
| 2011/0191117 A1* | 8/2011 | Hashim-Waris | G06Q 30/0633 705/2 |
| 2012/0151220 A1* | 6/2012 | Grecia | H04L 9/3234 713/189 |
| 2012/0330838 A1* | 12/2012 | Hoffman | G06Q 20/40 705/44 |
| 2013/0297514 A1* | 11/2013 | Giobbi | G06Q 20/4014 705/71 |
| 2013/0304648 A1* | 11/2013 | O'Connell | G07C 9/10 705/44 |
| 2014/0031956 A1* | 1/2014 | Slessman | G06F 1/3203 700/28 |
| 2014/0108073 A1* | 4/2014 | Castel | G06Q 10/063 705/7.11 |
| 2014/0114857 A1* | 4/2014 | Griggs | G06Q 40/00 705/44 |
| 2014/0180928 A1* | 6/2014 | O'Connor | G06Q 30/0607 705/59 |
| 2014/0189808 A1* | 7/2014 | Mahaffey | H04L 63/083 726/4 |
| 2014/0304778 A1* | 10/2014 | Grecia | H04L 63/10 726/4 |
| 2015/0120559 A1* | 4/2015 | Fisher | G06Q 20/4016 705/44 |
| 2015/0169892 A1* | 6/2015 | Nord | G06F 21/6218 726/9 |
| 2015/0178494 A1* | 6/2015 | Taratine | G06F 21/31 726/6 |
| 2015/0235167 A1* | 8/2015 | Wright | G06Q 10/087 705/28 |
| 2015/0294403 A1* | 10/2015 | Chu | G06Q 30/0645 705/307 |
| 2016/0034896 A1* | 2/2016 | O'Brien | G06Q 20/4014 705/37 |
| 2016/0239842 A1* | 8/2016 | Cash | G06Q 20/102 |
| 2016/0292686 A1* | 10/2016 | Laxminarayanan | G06Q 20/4014 |
| 2016/0328895 A1 | 11/2016 | Tse | |
| 2017/0046890 A1 | 2/2017 | Smith | |
| 2017/0061720 A1 | 3/2017 | Tse | |
| 2017/0171183 A1* | 6/2017 | Lingappa | H04L 9/3226 |
| 2017/0200165 A1* | 7/2017 | Laxminarayanan | H04L 9/3297 |
| 2017/0236089 A1* | 8/2017 | Hilemon | G06Q 10/087 705/28 |
| 2017/0237747 A1* | 8/2017 | Quinn | G06F 21/602 726/29 |
| 2017/0353436 A1* | 12/2017 | Jurss | G06F 21/45 |
| 2017/0366558 A1* | 12/2017 | Liu | H04L 63/101 |
| 2018/0053189 A1* | 2/2018 | Monk | H04W 4/029 |
| 2018/0114224 A1* | 4/2018 | Newland | H04L 63/123 |
| 2018/0137512 A1* | 5/2018 | Georgiadis | G06Q 50/184 |
| 2018/0167367 A1* | 6/2018 | John | H04L 9/0825 |
| 2018/0183802 A1* | 6/2018 | Choyi | H04L 63/102 |
| 2018/0204215 A1* | 7/2018 | Hu | H04L 63/08 |
| 2018/0234418 A1* | 8/2018 | Brown | H04L 63/0861 |
| 2019/0020478 A1* | 1/2019 | Girish | H04L 63/083 |
| 2019/0050853 A1* | 2/2019 | Kumar | G06Q 20/405 |
| 2019/0173883 A1* | 6/2019 | Chandoor | H04L 63/0853 |

\* cited by examiner

SYSTEMS AND METHODS FOR PROCESSING AN ACCESS REQUEST

CROSS REFERENCE TO RELATED APPLICATIONS

This patent application claims priority to Singapore Application No. 10201702881V filed on Apr. 7, 2017, the disclosure of which is incorporated by reference herein in its entirety as part of the present application.

BACKGROUND

The present disclosure relates to the processing of access requests. In particular, it provides systems and methods for processing access requests to an asset from a user.

There are many scenarios in which control over physical access to assets is required. For example, there is a large base of day to day users who use some form of credential to access a physical asset like an enterprise's building as an employee or guest, airports as a traveler, tourist spots as a tourist, a stadium as a sports lover and so on. The asset could be a vault, a restricted access area, a car door, an entrance into an airport, entrance into a stadium, and other things that require authorization to access.

BRIEF DESCRIPTION

In general terms, the present disclosure provides systems and methods for authenticating users for processing access requests to a physical asset.

A first aspect of the present disclosure provides a computer server for processing an access request. The computer server includes a computer processor and a data storage device, the data storage device having an authentication request generation module and an access response message generation module including non-transitory instructions operative by the processor to receive, from an access control terminal coupled to a physical asset, an access request of a user for access to the physical asset, the access request including a token data element associated with the user; generate an authentication verification request, the authentication verification request including an indication of the token data element, send the authentication verification request from a payment network, receive an authentication verification response over the payment network, the authentication verification response indicating the result of a verification of authorization to access the physical asset for a primary account number mapped to the token data element, generate an access response message using the access authentication response, and send the access response message to the access control terminal.

The data storage device of the computer server may further include a second factor authentication module including non-transitory instructions for verifying the identity of the user using a second factor authentication method.

In an embodiment the authentication request generation module further includes non-transitory instructions operative by the processor to generate the authentication verification request according to a message standard compatible with the payment network. The message standard compatible with the payment network may be the ISO8583 standard.

In an embodiment, the authentication verification request further includes a message type indicator.

In an embodiment, the access request further includes a dynamic cryptogram and the authentication verification request further includes the dynamic cryptogram.

The token data element may include a tokenized primary account number associated with the user.

A second aspect of the present disclosure provides a computer implemented method of processing an access request. The method includes receiving, in a computer server, an access request of a user for access to a physical asset, from an access control terminal coupled to the physical asset, the access request including a token data element associated with the user, generating, in an authentication request generation module of the computer server, an authentication verification request, the authentication verification request including an indication of the token data element, sending the authentication verification request over a payment network, receiving an authentication verification response from the payment network, the authentication verification response indicating the result of a verification of authorization to access the physical asset for a primary account number mapped to the token data element, generating, in an access response message generation module of the computer server, an access response message using the access authentication response, and sending the access response message to the access control terminal.

A third aspect of the present disclosure provides a system for controlling access to a physical asset. The system includes an access control terminal coupled to the physical asset and operable to: read a token from a user token device associated with a user, and generate control signals to allow access to the physical asset, an access control processing server operable to receive an access request from the access control terminal, the access request including the token, generate an authentication verification request including the token, send the authentication verification request to a network, receive an authentication response from the network, generate an access control response to cause the access control terminal to allow access to the asset in response to the authentication response, and send the access control response to the access control response. The system further includes a token service provider server coupled to the network, the token service provider server being operable to determine a primary account number associated with the user using the token, and an issuer server operable to receive the authentication request from the network and to generate the authentication response using the primary account number associated with the user.

The network may be a payment network. The authentication verification request and/or the authentication verification response may be generated according to the ISO8583 standard.

The authentication verification request and/or the authentication verification response may further include a message type indicator.

In an embodiment the access control terminal is further operable to receive a dynamic cryptogram from the user token device and the access request and the authentication verification request further include the dynamic cryptogram.

A fourth aspect of the present disclosure provides a method of controlling access to a physical asset. The method includes reading, in an access control terminal coupled to the physical asset, a token from a user token device associated with a user, sending an access request from the control terminal to an access control processing server, the access request including the token, generating, in the access control server, an authentication verification request including the token, sending the authentication verification request from the access control server over a network, determining a primary account number associated with the user using the token in a token service provider server coupled to the network, receiving the authentication request on the network at an issuer server, generating an authentication response at the issuer server using the primary account number associated with the user, sending the authentication response from the issuer server to the access control server over the network, receiving the authentication response and generating an access control response at the access control server, sending the access control response from the access control server to the access control terminal, and generating control signals to allow access to the physical asset at the access control terminal.

A further aspect of the present disclosure provides a non-transitory computer-readable medium. The computer-readable medium has stored thereon program instructions for causing at least one processor to perform operations of a method disclosed above.

BRIEF DESCRIPTION OF THE DRAWINGS

Embodiments of the disclosure will now be described for the sake of non-limiting example only, with reference to the following drawings in which.

DETAILED DESCRIPTION

Figure 1:
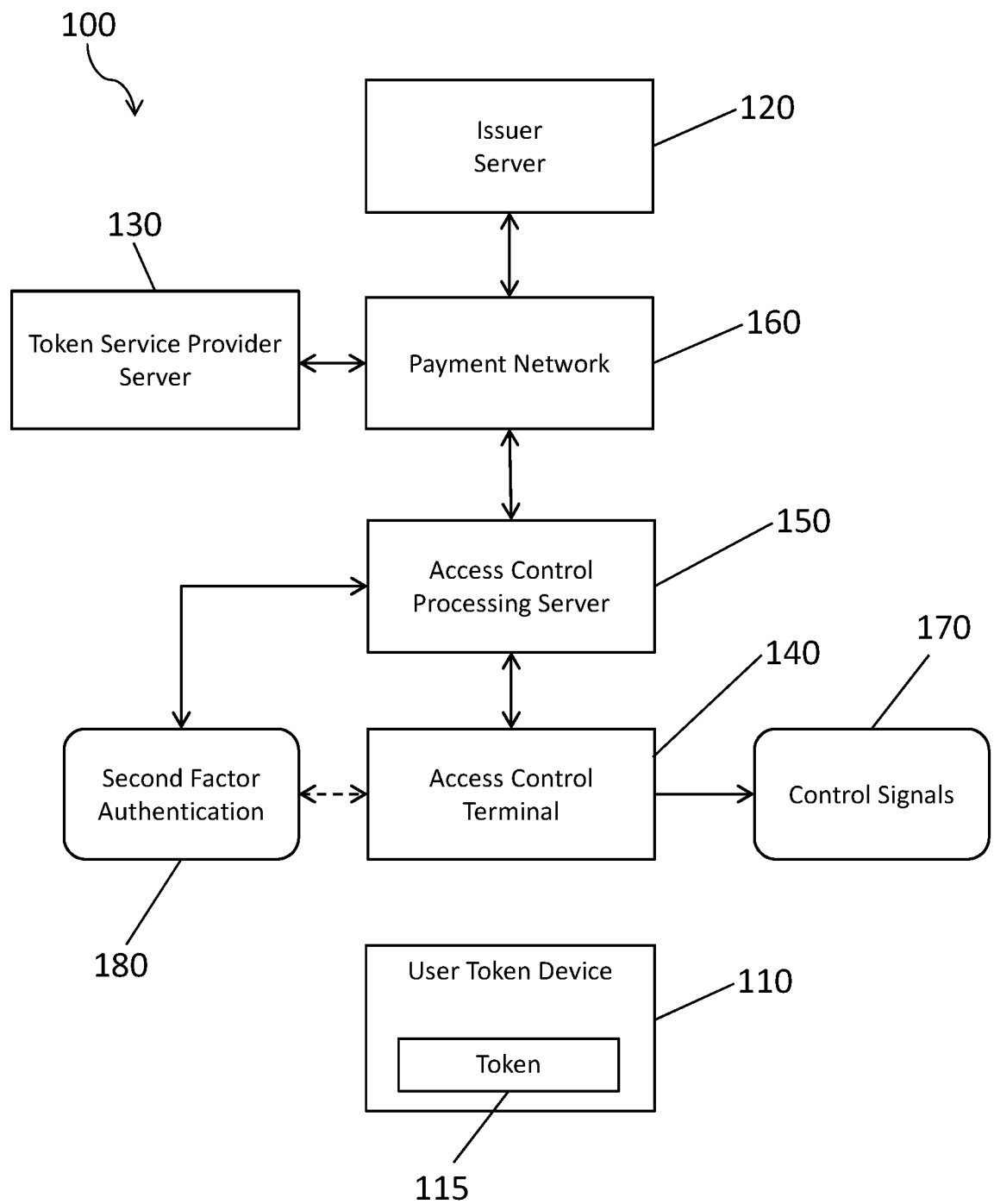
FIG. 1 is a block diagram of a system for processing access requests according to an embodiment of the present disclosure.

FIG. 1 is a block diagram showing a system for processing access requests according to an embodiment of the present disclosure. The system 100 processes access requests by a user of a user token device 110 to access a physical asset. The physical asset could be a vault, a restricted area access, a car door, an entrance into an airport, an entrance into a stadium or any other building, area of a building, or space which requires access control.

The system 100 includes an issuer server 120 which is a server associated with an organization responsible for issuing access authorizations to users. The system further includes a token service provider server 130. The token service provider server 130 provides tokens which are mapped to the primary account numbers.

The system 100 further includes an access control terminal 140 which is coupled to the physical asset, and an access control processing server 150 which is coupled to the access control terminal 140. The access control processing server 150, the issuer server 120 and the token service provider server 130 are all linked by a payment network 160. The payment network 160 is a payment network which can be used in the processing of payment transactions, for example the BankNet payment network operated by MasterCard.

The access control terminal 140 is operable to generate control signals 170 to allow access to the physical asset. The control signals 170 may be electronic signals that cause a lock on a door to unlock to allow the door to open, or may be control signals that cause a barrier or door to open to allow the user access to the physical asset.

As shown in FIG. 1, in some embodiments, the access control processing server 150 is operable to carry out second factor authentication 180, this may be implemented by, for example the access control processing server 150 sending a code to a mobile device associated with the user by text message and the user entering the code into the access control terminal 140.

In order to use the system 100, the user of a user token device 110 is provided with a token 115 which is stored on the user token device 110. The user token device 110 may be a "key fob" type device capable of storing electronic tokens, or alternatively may be portable device such as a smart phone having a secure memory (such as a Secure Element) capable of storing electronic tokens. In some embodiments, if the portable device does not have a secure memory then it may include a processor having a Trusted Execution Environment (TEE), or be executing a Host Card Emulation (HCE) service, in which case electronic tokens can be stored in the TEE or the HCE, or remotely from the portable device on a secure server.

In order to provide the token 115 to the user of the user token device 110, the issuer server 120 allocates a virtual primary account number (PAN) to the user. The token service provider 130 then tokenizes this PAN and provides the tokenized PAN to the user token device 110 for storage as the token 115.

In embodiments of the present disclosure, the virtual PAN provided for the user and thus the tokenized PAN have a format which corresponds to the format of account numbers of payment cards processed by the payment network 160. Thus the processing of authorization requests for access control which will be described below can advantageously be carried out in an analogous manner to the processing of payment authorization requests by an existing payment network 160, without requiring significant infrastructure modifications to the payment network 160.

Figure 2:
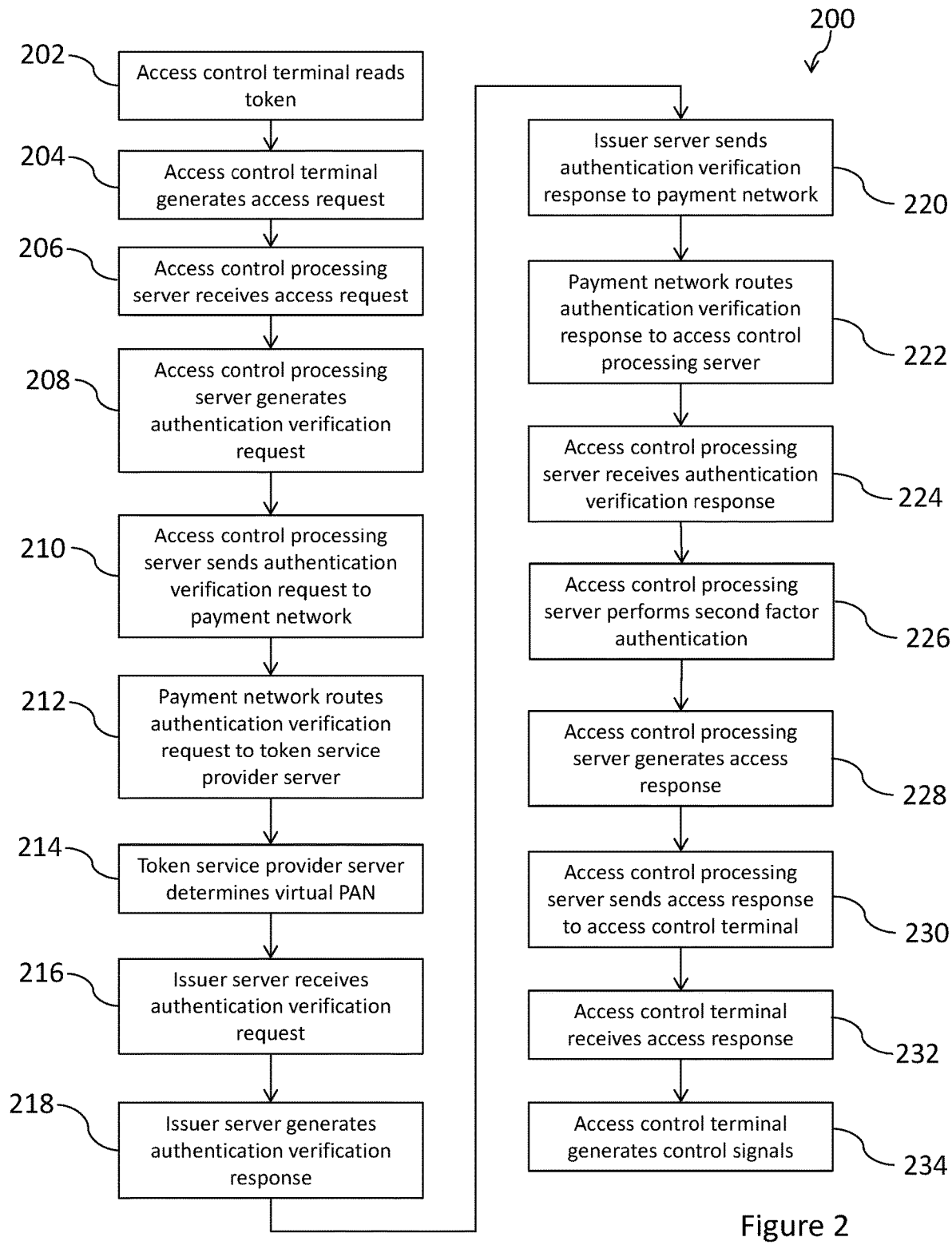
FIG. 2 is a flowchart showing a method of authenticating and controlling access to a physical asset according to an embodiment of the present disclosure.

FIG. 2 is a flowchart showing a method of authenticating and controlling access to a physical asset according to an embodiment of the present disclosure. The method 200 is performed on the system 100 described above with reference to FIG. 1. It should be noted that enumeration of operations is for purposes of example and that the operations need not be performed in the order implied by the enumeration.

In step 202, the access control terminal 140 reads the token 115 from the user token device 110. This may take place through a wireless communication interface such as near field communication (NFC). As described above, the token 115 represents a tokenized PAN for the user of the user token device 110.

In step 204, the access control terminal 140 generates an access request which is sent to the access control processing server 150. The access request includes an indication of the token 115 read from the user token device 110. The access request may also include an identifier of the asset to which the user has requested access. The access control terminal 140 may be located at an entrance to the asset and therefore the identifier of the asset may be an identifier of the access control terminal 140.

In step 206, the access control processing server 150 receives the access request from the access control terminal.

In step 208, the access control processing server 150 generates an authentication verification request. The authentication verification request includes the token 115 which the access control processing server 150 received from the access control terminal 140. The authentication verification request is in a message format used by the payment network 160.

In step 210, the access control processing server 150 sends the authentication verification request to the payment network 160.

In step 212, the authentication verification request is identified as corresponding to a tokenized PAN by the payment network 160 and is routed by the payment network 160 to the token service provider server 130.

In step 214, the token service provider server 130 determines the virtual PAN corresponding to the token 115 and provides this to the issuer server 120 with the authentication verification request.

In step 216, the issuer server 120 receives the authentication verification request including the virtual PAN and the identifier of the asset to which the user has requested access. The authentication request received by the issuer server 120 also includes the token 115 in addition to the virtual PAN.

In step 218, the issuer server 120 determines whether the user associated with the virtual PAN is authorized to access the asset and generates an authentication verification response. The issue server 120 may store a database or be coupled to a database indicating which users corresponding to virtual PANs are authorized to access which physical assets. The verification response includes the token 115.

In step 220, the issuer server 120 sends the authentication verification response to the payment network 160.

In step 222, the payment network 160 identifies the authentication verification response and routes it to the access control processing server 150.

In step 224, the access control processing server 150 receives the authentication verification response.

In step 226, the access control processing server 150 performs a second factor authentication 180. Examples of possible implementations of the second factor authentication 180 are discussed in more detail below in relation to FIG. 4.

In step 228, the access control processing server 150 uses the authentication verification response and the result of the second factor authentication to generate an access response. The access response indicates whether the user is authorized to access the physical asset.

In step 230, the access control processing server 150 sends the access response to the access control terminal 140.

In step 232, the access control terminal 140 receives the access response.

In step 234, the access control terminal 140 generates control signals 170 to allow access by the user to the physical asset.

Figure 3:
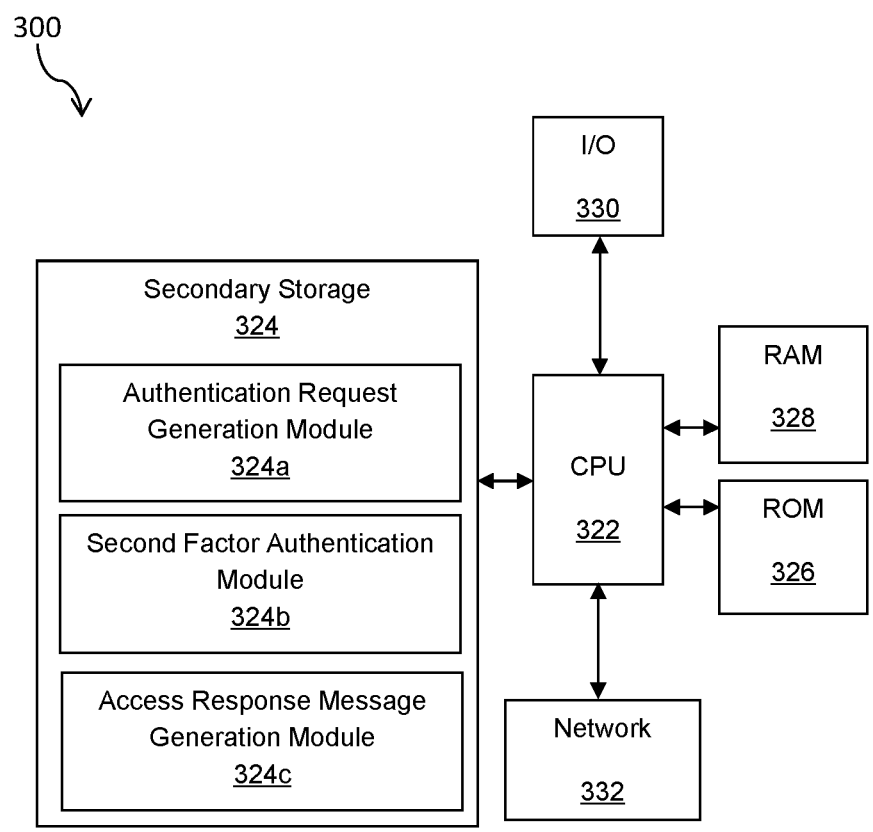
FIG. 3 is a block diagram showing a technical architecture of an access control processing server according to an embodiment of the present disclosure.
Figure 4:
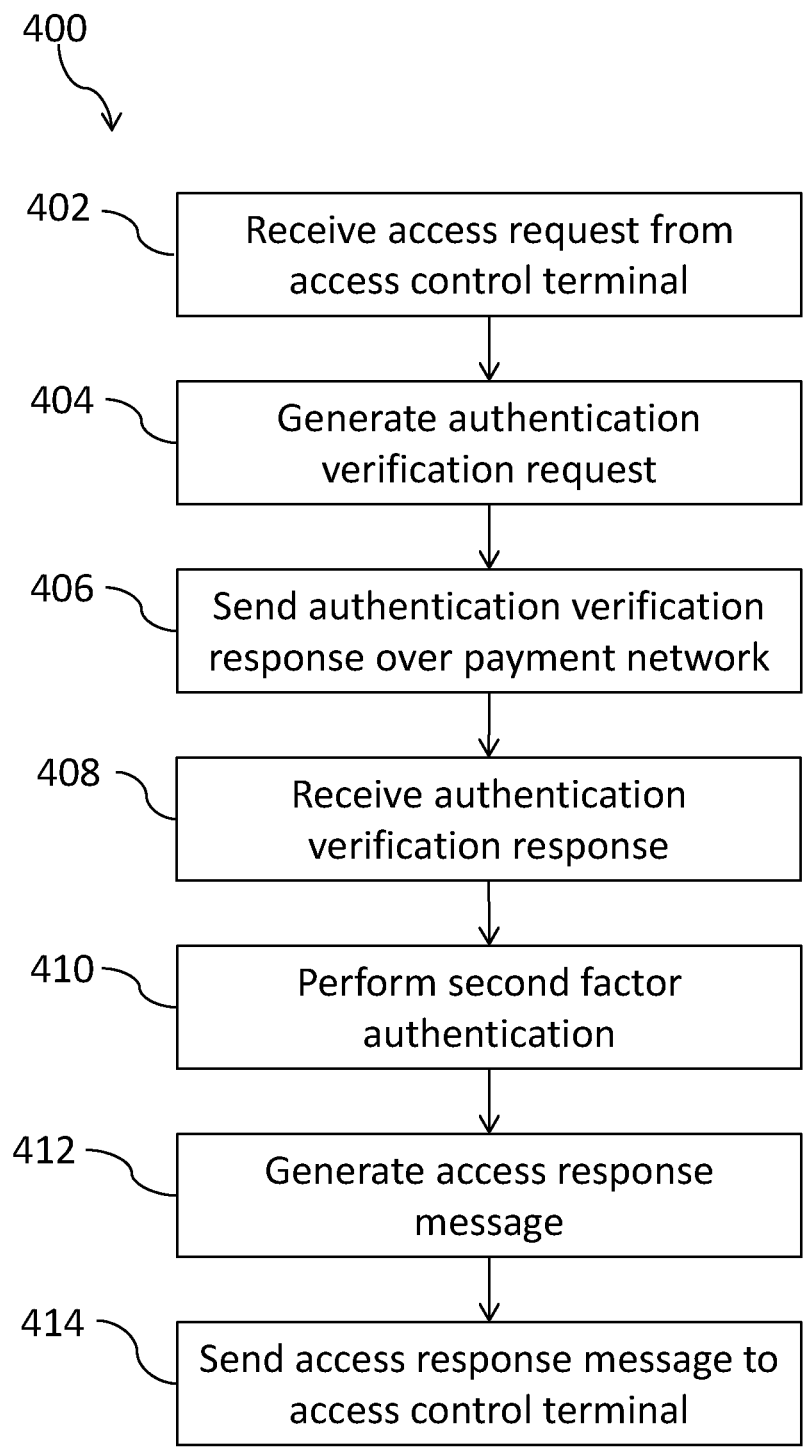
FIG. 4 is a flowchart showing a method of processing an access request according to an embodiment of the present disclosure.

FIG. 3 is a block diagram showing a technical architecture 300 of the access control processing server 150 for performing an exemplary method 400 as described below with reference to FIG. 4. Typically, the method 400 is implemented by a computer having a data-processing unit. The block diagram as shown in FIG. 3 illustrates a technical architecture 300 of a computer which is suitable for implementing one or more embodiments herein.

The technical architecture 300 includes a processor 322 (which may be referred to as a central processor unit or CPU) that is in communication with memory devices including secondary storage 324 (such as disk drives), read only memory (ROM) 326, and random access memory (RAM) 328. The processor 322 may be implemented as one or more CPU chips. The technical architecture 300 may further include input/output (I/O) devices 330, and network connectivity devices 332.

The secondary storage 324 typically includes one or more disk drives or tape drives and is used for non-volatile storage of data and as an over-flow data storage device if RAM 328 is not large enough to hold all working data. Secondary storage 324 may be used to store programs which are loaded into RAM 328 when such programs are selected for execution. In this embodiment, the secondary storage 324 has an authentication request generation module 324a, a second factor authentication module 324b, and an access response message generation module 324c including non-transitory instructions operative by the processor 322 to perform various operations of the method of the present disclosure. As depicted in FIG. 3, the modules 324a-324c are distinct modules which perform respective functions implemented by the access control processing server 300. It will be appreciated that the boundaries between these modules are exemplary only, and that alternative embodiments may merge modules or impose an alternative decomposition of functionality of modules. For example, the modules discussed herein may be decomposed into sub-modules to be executed as multiple computer processes, and, optionally, on multiple computers. Moreover, alternative embodiments may combine multiple instances of a particular module or sub-module. It will also be appreciated that, while a software implementation of the modules 324a-324c is described herein, these may alternatively be implemented as one or more hardware modules (such as field-programmable gate array(s) or application-specific integrated circuit(s)) including circuitry which implements equivalent functionality to that implemented in software. The ROM 326 is used to store instructions and perhaps data which are read during program execution. The secondary storage 324, the RAM 328, and/or the ROM 326 may be referred to in some contexts as computer readable storage media and/or non-transitory computer readable media.

I/O devices 330 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that enable radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other known network devices. These network connectivity devices 332 may enable the processor 322 to communicate with the Internet or one or more intranets. With such a network connection, it is contemplated that the processor 322 might receive information from the network, or might output information to the network in the course of performing the above-described method operations. Such information, which is often represented as a sequence of instructions to be executed using processor 322, may be received from and outputted to the network, for example, in the form of a computer data signal embodied in a carrier wave.

The processor 322 executes instructions, codes, computer programs, scripts which it accesses from hard disk, floppy disk, optical disk (these various disk based systems may all be considered secondary storage 324), flash drive, ROM 326, RAM 328, or the network connectivity devices 332. While only one processor 322 is shown, multiple processors may be present. Thus, while instructions may be discussed as executed by a processor, the instructions may be executed simultaneously, serially, or otherwise executed by one or multiple processors.

Although the technical architecture 300 is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 300 to provide the functionality of a number of servers that is not directly bound to the number of computers in the technical architecture 300. In an embodiment, the functionality disclosed above may be provided by executing the application and/or applications in a cloud computing environment. Cloud computing may include providing computing services via a network connection using dynamically scalable computing resources. A cloud computing environment may be established by an enterprise and/or may be hired on an as-needed basis from a third party provider.

It is understood that by programming and/or loading executable instructions onto the technical architecture 300, at least one of the CPU 322, the RAM 328, and the ROM 326 are changed, transforming the technical architecture 300 in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Various operations of an exemplary method 400 will now be described with reference to FIG. 4 in respect of processing an access request by the access control processing server 150. The method 400 described below with reference to FIG. 4 corresponds to an embodiment of the processing steps carried out by the access control processing server 150 as part of the method 200 described above in relation to FIG. 2. It should be noted that enumeration of operations is for purposes of clarity and that the operations need not be performed in the order implied by the enumeration.

In step 402, the access control processing server 150 receives an access request from the access control terminal 140. The access request includes a token data element which was read by the access control terminal 140 from the user token device 110.

In some embodiments, the access request also includes a dynamic cryptogram. The processing to generate this dynamic cryptogram will now be described.

Figure 5:
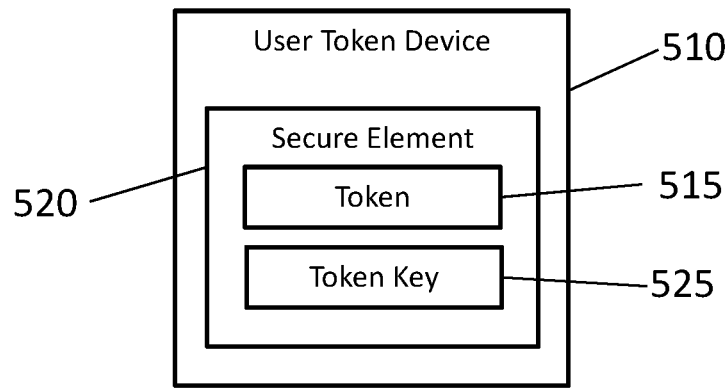
FIG. 5 is a block diagram showing a user token device for use with embodiments of the present disclosure.

FIG. 5 is a block diagram showing a user token device for use with embodiments of the present disclosure. The user token device 510 may be a token storage device having the specific function of storing tokens, or may be a mobile device such as a smartphone with the capability to store digital tokens. As shown in FIG. 5, the user token device 510 includes a secure element 520 which stores a token 515 and a token key 525. The secure element 520 is a secure memory of the user token device 510. It will be appreciated that non-SE implementations are also possible, for example by making use of HCE. The user token device 510 may also include a communication interface such as a NFC communication interface to allow communication with the access control terminal 140.

When generating the access request at the access control terminal, the user token device 510 provides the token 515 to the access control terminal 140 and a dynamic cryptogram is generated for the access request using the token key 525. The dynamic cryptogram is generated using the token key 525 and data of the access request. The dynamic cryptogram is used by the token service provider in the later processing to validate the integrity of the access request.

Returning now to FIG. 4, in step 404 the authentication request generation module 324a of the access control processing server 150 generates an authentication verification request.

The authentication verification request may be formatted according to the ISO8583 standard. Such formatting allows the authentication verification request to be processed and routed by the payment network 160 in the same manner as payment transaction messages are processed. Thus, in embodiments of the present disclosure existing payment network authentication message processing infrastructure may be used in the processing of authentication messages for access control.

Figure 6:
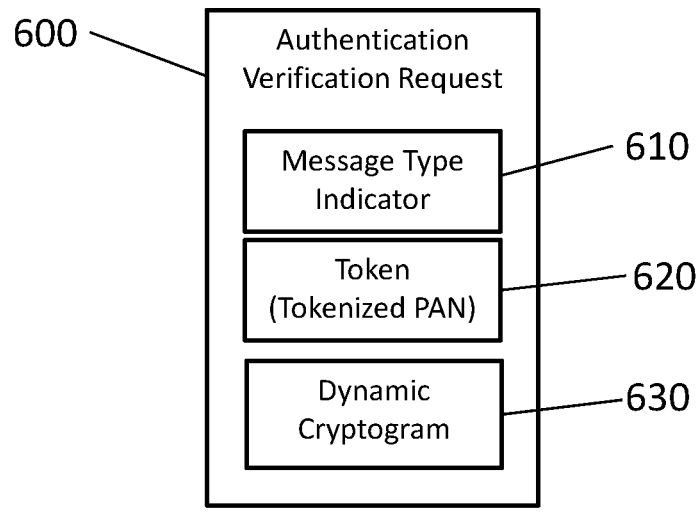
FIG. 6 is a block diagram showing the structure of an authentication verification request in an embodiment of the present disclosure.

FIG. 6 is a block diagram showing the structure of an authentication verification request in an embodiment of the present disclosure. As shown in FIG. 6, the authentication verification request 600 includes a message type indicator 610, a token 620 which as discussed above is a tokenized PAN, and a dynamic cryptogram 630.

The token 620 and the dynamic cryptogram 630 are formed from data elements received from the user token device 110 in step 402. The message type indicator 610 represents the type of message and may be used during the routing of the authentication verification request by the payment network 160. The structure of the message type indicator 610 will now be described in more detail with reference to FIG. 7.

Figure 7:
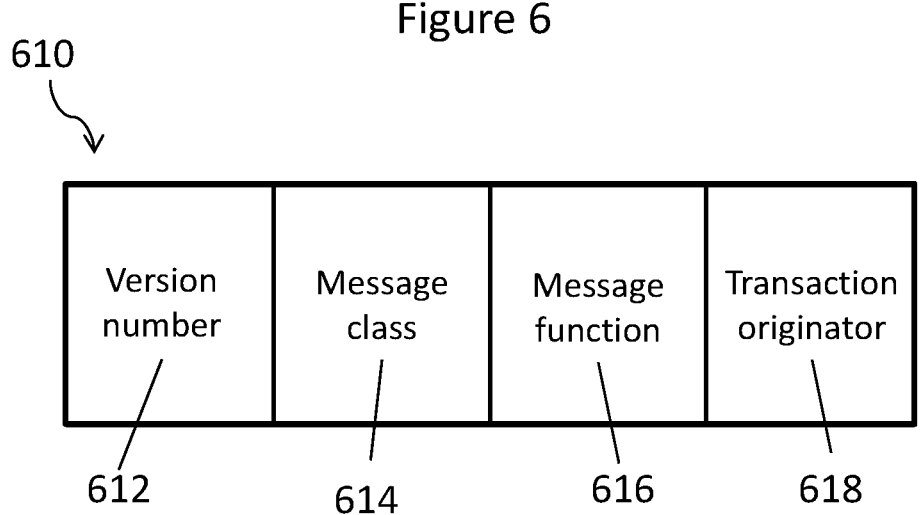
FIG. 7 is a block diagram showing the structure of a message type indicator in an embodiment of the present disclosure.

FIG. 7 is a block diagram showing the structure of a message type indicator in an embodiment of the present disclosure. The message type indicator 610 includes four indicators: a version number indicator 612, a message class indicator 614, a message function indicator 616, and a transaction originator indicator 618. The version number indicator 612 indicates the version of the ISO8583 standard to which the message is formatted. Here 0 indicates the 1987 version, 1 indicates the 1993 version, and 2 indicates the 2003 version of the ISO8583 standard. The message class indicator 614 indicates the purpose of the message. The value 1 indicates an authorization message, 2 indicates a financial message, 3 indicates a file action message, and 4 indicates a reversal message. The message function indicator 616 indicates the message flow. The value 0 indicates a request, the value 1 indicates a response, the value 2 indicates advice, the value 3 indicates an advice response, and the value 4 indicates a notification. The transaction originator indicator 618 specifies the source of the message. The value 0 indicates an acquirer, the value 1 indicates an acquirer repeat, the value 2 indicates an issuer, the value 3 indicates an issuer repeat, the value 4 indicates other, and the value 5 indicates other repeat.

In embodiments of the present disclosure, since the messages relate to authentication and authorization for access control the messages will not contain any financial information. Therefore the authentication platform provided by the payment network will identify the messages as authentication and authorization messages.

In the presently described scenario it is envisaged that the message type indicators may be of the form 0104 for the authentication verification request and of the form 0114 for the authentication verification response. Here, it is assumed that the messages are in the ISO8583-1987 format, thus the first digit 0 represents the 1987 version of the standard. The second digit indicates that the message class is authorization. The third digit indicates the messages are a request and a response respectively. The fourth digit indicates that the transaction originator is of the "other" type. Here the transaction originator is the access control processing server 150 which does not fall into one of the defined sources in the ISO8583 standard.

Returning again to FIG. 4, in step 406 the access control processing server 150 sends the authentication verification request over to the payment network 160. As discussed above, the payment network uses the tokenized PAN and the message type indicator of the authentication verification request to route the authentication verification request in a similar manner to routing of payment transaction authorization requests.

In step 408, the access control processing server 150 receives an authentication verification response over the payment network 160. As described above in relation to FIG. 2, the authentication verification response is sent by the issuer server 120 and indicates that the identity of the user has been authenticated by the issuer server 120 and/or by the token sever provider server 130, and further that the user is authorized to access the physical asset.

In step 410, the second factor authentication module 324*b* of the access control processing server 150 performs second factor authentication to verify the user. The second factor authentication may be carried out in a number of different ways. In one embodiment, the second factor authentication is carried out by sending a message, such as a short messaging service (SMS) or e-mail message to a mobile telephone or other device registered to the user. This message contains an access code such as a PIN number or one time password which the user enters on a key pad of the access control terminal 140. In such an embodiment, the second factor authentication includes checking that the code entered by the user matches the code contained in the message. In other embodiments, the second factor authentication may be carried out using biometric data of the user. For example, the second factor authentication may be carried out using the Adahaar authentication provided by the Unique Identification Authority of India to verify biometric data read by the access control terminal 140.

In step 412, the access response message generation module 324*c* of the access control server 150 generates an access response message. The access response message indicates whether the user was authenticated and has authorization to access the asset.

In step 414, the access control processing server sends the access response message to the access control terminal 140.

Following step 414, the access control terminal 140 follows the steps described above in relation to FIG. 2.

Whilst the foregoing description has described exemplary embodiments, it will be understood by those skilled in the art that many variations of the embodiment can be made within the scope and spirit of the present disclosure.

What is claimed is:

1. A computer server for processing an access request, the computer server comprising a processor and a data storage device, the data storage device having an authentication request generation module and an access response message generation module comprising non-transitory instructions executable by the processor to:

receive, from an access control terminal coupled to a physical asset, an access request generated using, at least in part, a token data element received from a user token device i) in communication with the access control terminal and ii) being within a proximate distance from the access control terminal, the access request requesting that a user operating the user token device be granted physical access to the physical asset, the physical asset including at least a barrier that controls the physical access to the physical asset via the access control terminal, the access request comprising the token data element associated with a primary account number of the user, a physical asset identifier identifying the physical asset, and a dynamic cryptogram validating an integrity of the access request;

generate an authentication verification request based on the access request, the authentication verification request comprising an indication of the token data element, the physical asset identifier, and the dynamic cryptogram;

send the authentication verification request to an issuer server over a payment network;

receive an authentication verification response from the issuer server over the payment network, the authentication verification response indicating a result of a verification of authorization to access the physical asset for the primary account number mapped to the token data element;

generate a second factor authentication message including one of i) an access code to be inputted on the access control terminal to gain the physical access to the physical asset and ii) a request for biometric data of the user to be inputted on the access control terminal to gain the physical access to the physical asset;

transmit the second factor authentication message to a user computer device of the user;

in response to transmitting the second factor authentication message, receive, from the access control terminal, one of i) a candidate access code and ii) candidate biometric data;

generate an access response message based on the authentication verification response and a comparison between one of i) the access code and the candidate access code and ii) the biometric data and the candidate biometric data; and send the access response message to the access control terminal, the access response message including one of an approval of the physical access to the physical asset and a denial of the physical access to the physical asset, wherein the approval enables the access control terminal to generate electronic control signals that cause the barrier to unlock to enable the user to physically cross the barrier and gain the physical access to the physical asset.

2. A computer server according to claim 1, the data storage device further comprising a second factor authentication module comprising non-transitory instructions executable by the processor to verify the identity of the user using a second factor authentication method.

3. A computer server according to claim 1, wherein the authentication request generation module further comprises non-transitory instructions executable by the processor to generate the authentication verification request according to a message standard compatible with the payment network.

4. A computer server according to claim 3, wherein the message standard compatible with the payment network is an ISO8583 standard.

5. A computer server according to claim 1, wherein the authentication verification request further comprises a message type indicator.

6. A computer server according to claim 1, wherein the token data element comprises a tokenized primary account number associated with the user.

7. A computer server according to claim 1, wherein the physical asset further includes at least one of a lock and a door.

8. A computer implemented method for processing an access request, the method comprising:
receiving, in a computer server, the access request generated using, at least in part, a token data element received from a user token device i) in communication with an access control terminal and ii) being within a proximate distance from the access control terminal, the access request requesting that a user operating the user token device be granted physical access to a physical asset, from an access control terminal coupled to the physical asset, the physical asset including at least a barrier that controls the physical access to the physical asset via the access control terminal, the access request comprising the token data element associated with a primary account number of the user, a physical asset identifier identifying the physical asset, and a dynamic cryptogram validating an integrity of the access request;
generating, in an authentication request generation module of the computer server, an authentication verification request based on the access request, the authentication verification request comprising an indication of the token data element, the physical identifier, and the dynamic cryptogram;
sending the authentication verification request to an issuer over a payment network;
receiving an authentication verification response from the issuer over the payment network, the authentication verification response indicating a result of a verification of authorization to access the physical asset for the primary account number mapped to the token data element;
generating a second factor authentication message including one of i) an access code to be inputted on the access control terminal to gain the physical access to the physical asset and ii) a request for biometric data of the user to be inputted on the access control terminal to gain the physical access to the physical asset;
transmitting the second factor authentication message to a user computer device of the user;
in response to transmitting the second factor authentication message, receiving, from the access control terminal, one of i) a candidate access code and ii) candidate biometric data;
generating, in an access response message generation module of the computer server, an access response message based on the authentication verification response and a comparison between one of i) the access code and the candidate access code and ii) the biometric data and the candidate biometric data; and
sending the access response message to the access control terminal, the access response message including one of an approval of the physical access to the physical asset and a denial of the physical access to the physical asset, wherein the approval enables the access control terminal to generate electronic control signals that cause the barrier to unlock to enable the user to physically cross the barrier and gain the physical access to the physical asset.

9. A method according to claim 8, further comprising verifying the identity of the user using a second factor authentication method in a second factor authentication module of the computer server.

10. A method according to claim 8, wherein the authentication verification request is generated according to a message standard compatible with the payment network.

11. A method according to claim 10 wherein the message standard compatible with the payment network is an ISO8583 standard.

12. A method according to claim 8, wherein the authentication verification request further comprises a message type indicator.

13. A method according to claim 8, wherein the token data element comprises a tokenized primary account number associated with the user.

14. A non-transitory computer readable medium having stored thereon program instructions for causing at least one processor to perform a method according to claim 8.

15. A method according to claim 8, wherein the physical asset further includes at least one of a lock and a door.

16. A method for controlling physical access to a physical asset, the method comprising:
reading, in an access control terminal coupled to the physical asset, a token from a user token device operated by a user, the user token device i) in communication with the access control terminal and ii) being within a proximate distance from the access control terminal, the physical asset including at least a barrier that controls the physical access to the physical asset via the access control terminal, the token associated with a primary account number of the user;
generating using, at least in part, the token received from the user token device, an access request requesting that the user operating the user token device be granted the physical access to the physical asset, the access request comprising the token, a physical asset identifier identifying the physical asset, and a dynamic cryptogram validating an integrity of the access request;
sending the access request from the access control terminal to an access control server;
generating, in the access control server, an authentication verification request based on the access request, the authentication verification request comprising the token, the physical asset identifier, and the dynamic cryptogram;
sending the authentication verification request from the access control server to a token service provider server over a network;
determining the primary account number associated with the user using the token in the token service provider server coupled to the network;

receiving the authentication verification request at an issuer server, the authentication verification request received over the network;

generating an authentication verification response at the issuer server using the primary account number associated with the user;

sending the authentication verification response from the issuer server to the access control server over the network;

receiving a response to the authentication verification response from the issuer server over the network, the response indicating a result of a verification of authorization to the physical access of the physical asset for the primary account number mapped to the token;

generating, in the access control server, a second factor authentication message including one of i) an access code to be inputted on the access control terminal to gain the physical access to the physical asset and ii) a request for biometric data of the user to be inputted on the access control terminal to gain the physical access to the physical asset;

transmitting, by the access control server, the second factor authentication message to a user computer device of the user;

in response to transmitting the second factor authentication message, receiving, from the access control terminal, one of i) a candidate access code and ii) candidate biometric data;

generating, at the access control server, an access control response based on the authentication verification response and a comparison between one of i) the access code and the candidate access code and ii) the biometric data and the candidate biometric data;

sending the access control response from the access control server to the access control terminal, the access control response including one of an approval of the physical access to the physical asset and a denial of the physical access to the physical asset; and in response to sending the approval, generating control signals that cause the barrier to unlock to enable the user to physically cross the barrier and gain the physical access to the physical asset.

17. A method according to claim 16, wherein the network is a payment network.

18. A method according to claim 16, wherein at least one of the authentication verification request and the authentication verification response are generated according to an ISO8583 standard.

19. A method according to claim 16, wherein at least one of the authentication verification request and the authentication verification response further comprise a message type indicator.

20. A non-transitory computer readable medium having stored thereon program instructions for causing at least one processor to perform a method according to claim 16.

21. A method according to claim 16, wherein the physical asset further includes at least one of a lock and a door.

* * * * *